US009841607B2

(12) United States Patent
Donaldson et al.

(10) Patent No.: US 9,841,607 B2
(45) Date of Patent: Dec. 12, 2017

(54) METHOD AND APPARATUS FOR STABILIZING A LINE OF SIGHT OF A RADIANT ENERGY SYSTEM

(71) Applicant: The Boeing Company, Chicago, IL (US)

(72) Inventors: Jed Eden Donaldson, Bernalillo, NM (US); Kirk Alan Lohnes, Bosque Farms, NM (US); Bruce Edward Stribling, Albuquerque, NM (US); David R. Dean, Bernalillo, NM (US)

(73) Assignee: THE BOEING COMPANY, Chicago, IL (US)

( * ) Notice: Subject to any disclaimer, the term of this patent is extended or adjusted under 35 U.S.C. 154(b) by 250 days.

(21) Appl. No.: 14/701,976

(22) Filed: May 1, 2015

(65) Prior Publication Data

US 2016/0320630 A1 Nov. 3, 2016

(51) Int. Cl.
*G02B 27/64* (2006.01)

(52) U.S. Cl.
CPC ......... *G02B 27/644* (2013.01); *G02B 27/646* (2013.01); *G02B 27/648* (2013.01)

(58) Field of Classification Search
CPC ... G02B 27/644; G02B 27/646; G02B 27/648
See application file for complete search history.

(56) References Cited

U.S. PATENT DOCUMENTS

| 3,446,980 A | 5/1969 | Meier |
| 3,518,016 A | 6/1970 | Burdin et al. |
| 3,612,634 A | 10/1971 | Moore, Jr. |
| 3,951,510 A | 4/1976 | Lloyd |
| 5,027,047 A | 6/1991 | Logan et al. |
| 8,208,203 B1 * | 6/2012 | Ramsey ............... G02B 23/16 353/3 |
| 8,536,503 B2 * | 9/2013 | Cook .................... G02B 5/09 244/3.16 |
| 9,104,040 B2 * | 8/2015 | Shemesh ............ G02B 27/644 |
| 2002/0145102 A1 * | 10/2002 | Eckelkamp-Baker G02B 27/646 250/203.1 |

OTHER PUBLICATIONS

Tack et al., "Cast Glance Near Infrared Imaging Observations of the Space Shuttle During Hypersonic Re-entry," AIAA Aerospace Sciences Meeting Including the New Horizons Forum and Aerospace Exposition, Jan. 2010, 14 pages.

Merritt et al., "Beam control for high-energy laser devices," Optical Engineering, vol. 52, Issue 2, Feb. 2013, 11 pages.

(Continued)

*Primary Examiner* — Francis M Legasse, Jr.
(74) *Attorney, Agent, or Firm* — Yee & Associates, P.C.

(57) ABSTRACT

A method and apparatus for stabilizing a line of sight of a radiant energy system. The line of sight of a main beam is positioned using a first reflector and a second reflector based on a reference beam that is inertially stabilized in a selected direction. The line of sight of the main beam is stabilized using the reference beam to counteract a number of disturbances created within an optical path of the main beam.

20 Claims, 7 Drawing Sheets

(56) References Cited

OTHER PUBLICATIONS

Deyoung et al., "Beam control system for an airborne laser radar," Gas, Chemical, and Electrical Lasers and Intense Beam Control and Applications, Proceedings of SPIE vol. 3931, Jan. 2000, pp. 311-320.
Walter et al., "Stabilized Inertial Measurement System (SIMS)," Laser Weapons Technology III, Proceedings of SPIE vol. 4724, Apr. 2002, pp. 57-68.
Luniewicz et al., "Testing the inertial pseudo star reference unit," SPIE vol. 2221, Apr. 1994, pp. 638-649.
Friel et al., "Vibration Evaluation of a Precision Inertial Reference Unit," Acquisition, Tracking, Pointing, and Laser Systems Technologies XXI, SPIE vol. 6569, Apr. 2007, 11 pages.

\* cited by examiner

METHOD AND APPARATUS FOR STABILIZING A LINE OF SIGHT OF A RADIANT ENERGY SYSTEM

BACKGROUND INFORMATION

1. Field

The present disclosure relates generally to radiant energy systems and, in particular, to stabilizing a line of sight of a radiant energy system. Still more particularly, the present disclosure relates to a method and apparatus for stabilizing a line of sight of a main beam of a radiant energy system using a reference beam that is inertially stabilized and generated outside of an optical path of the main beam.

2. Background

A radiant energy system may be any system capable of emitting a beam of radiant energy, receiving a beam of radiant energy, or both. Radiant energy may be the energy of electromagnetic radiation, which may take the form of visible light, ultraviolet radiation, infrared radiation, microwaves, radio waves, gamma rays, X-rays, thermal radiation, or some other form of electromagnetic radiation. Radiant energy systems may have various applications. Some examples of radiant energy systems include, but are not limited to, laser weapon systems, target tracking systems, and imaging systems.

The line of sight of a radiant energy system may be the path along which a beam is emitted by the radiant energy system, the path along which a beam is received by the radiant energy system, or both. Various factors may make stabilizing the line of sight of a radiant energy system more difficult than desired. These factors may include, but are not limited to, movement of the radiant energy system, movement of a platform on which the radiant energy system is mounted, movement of a target object being tracked by the radiant energy system, dynamic atmospheric effects, dynamics of the radiant energy system, other types of factors, or some combination thereof. As one example, movement of a vehicle on which a radiant energy system is mounted may cause vibration disturbances that affect the line of sight.

Some currently available systems for stabilizing the line of sight of a radiant energy system may increase the weight, size, or both of the radiant energy system more than desired. Further, some currently available systems for stabilizing the line of sight of a radiant energy system may be more complex and include a greater number of physical components than desired. Therefore, it would be desirable to have a method and apparatus that take into account at least some of the issues discussed above, as well as other possible issues.

SUMMARY

In one illustrative embodiment, an apparatus comprises a first optical system and a second optical system. The first optical system positions a line of sight of a main beam based on a reference beam that is inertially stabilized in a selected direction. The first optical system includes a first reflector and a second reflector. The second optical system stabilizes the line of sight of the main beam using the reference beam to counteract a number of disturbances created within an optical path of the main beam.

In another illustrative embodiment, a radiant energy system comprises a coelostat-type reflector system and a reference beam generator. The coelostat-type reflector system controls a line of sight of a main beam. The reference beam generator is located outside of an optical path of the main beam. The reference beam generator generates and emits a reference beam that is inertially stabilized in a selected direction. The coelostat-type reflector system controls a positioning of the line of sight of the main beam based on the selected direction of the reference beam.

In yet another illustrative embodiment, a method for stabilizing a line of sight of a radiant energy system is provided. The line of sight of a main beam is positioned using a first reflector and a second reflector based on a reference beam that is inertially stabilized in a selected direction. The line of sight of the main beam is stabilized using the reference beam to counteract a number of disturbances created within an optical path of the main beam.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a method and apparatus for stabilizing a line of sight of a radiant energy system. In particular, the illustrative embodiments provide a method and apparatus for stabilizing a line of sight of a radiant energy system using a reference beam that is inertially stabilized. As one illustrative example, a line of sight of a main beam may be positioned by a first optical system based on a reference beam that is inertially stabilized in a selected direction. The line of sight of the main beam may be stabilized by a second optical system using the reference beam to counteract a number of disturbances created within an optical path of the main beam.

The first optical system and the second optical system may be implemented in a manner that enables stabilization of the line of sight of the radiant energy system without increasing the weight, size, or complexity of the radiant energy system more than desired. In some cases, the first optical system may include a coelostat-type reflector system. The coelostat-type reflector system may include two reflectors, each being independently rotatable about a single axis. These two reflectors may take the form of, for example, two planar mirrors. A planar mirror is a mirror that has a surface that is substantially planar, or flat. One planar mirror of the coelostat-type reflector system may be independently rotatable about an azimuth axis, while the other planar mirror may be independently rotatable about an elevation axis.

The second optical system may include a correcting device configured to stabilize the line of sight of the main beam to counteract any number of disturbances created within the optical path of the main beam. These disturbances may be caused by, for example, without limitation, movement of the radiant energy system, movement of a platform on which the radiant energy system is mounted, movement of a target object being tracked by the radiant energy system, dynamic atmospheric effects, dynamics of the radiant energy system, other types of factors, or some combination thereof. In this manner, jitter in the line of sight may be reduced to within selected tolerances.

Figure 1:
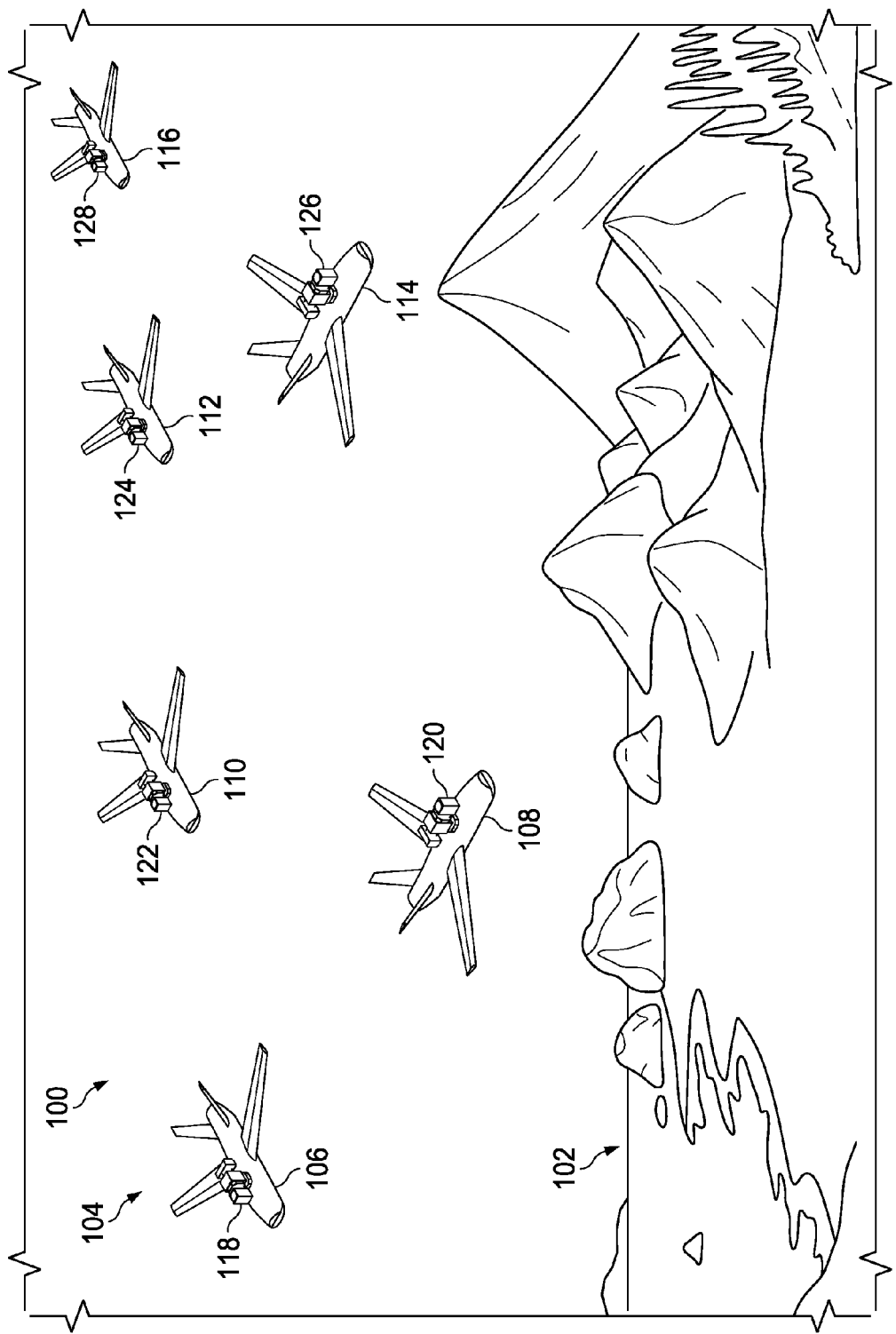
FIG. 1 is a diagrammatic representation of an environment in which radiant energy systems may be used in accordance with an illustrative embodiment.

Referring now to the figures and, in particular, with reference to FIG. 1, a diagrammatic representation of an environment in which radiant energy systems may be used is depicted in accordance with an illustrative embodiment. Environment 100 may be an example of one type of environment in which radiant energy systems may be used to perform surveillance, target tracking, weapons targeting, other types of operations, or some combination thereof.

In this illustrative example, environment 100 may be a region of terrain 102 that is under surveillance. This surveillance may be performed using group of unmanned aerial vehicles 104. As depicted, group of unmanned aerial vehicles 104 includes unmanned aerial vehicle 106, unmanned aerial vehicle 108, unmanned aerial vehicle 110, unmanned aerial vehicle 112, unmanned aerial vehicle 114, and unmanned aerial vehicle 116. Radiant energy system 118, radiant energy system 120, radiant energy system 122, radiant energy system 124, radiant energy system 126, and radiant energy system 128 are mounted on unmanned aerial vehicle 106, unmanned aerial vehicle 108, unmanned aerial vehicle 110, unmanned aerial vehicle 112, unmanned aerial vehicle 114, and unmanned aerial vehicle 116, respectively.

In this illustrative example, each of these radiant energy systems may take the form of a surveillance system onboard the corresponding unmanned aerial vehicle that is used to perform surveillance of region of terrain 102. In other illustrative examples, each of radiant energy system 118, radiant energy system 120, radiant energy system 122, radiant energy system 124, radiant energy system 126, and radiant energy system 128 may take the form of a laser weapon system, a target tracking system, or some other type of system.

In this illustrative example, each of radiant energy system 118, radiant energy system 120, radiant energy system 122, radiant energy system 124, radiant energy system 126, and radiant energy system 128 may include a coelostat-type reflector system. Further, each of these radiant energy systems may use a reference beam generated by an inertial reference system (not shown) to stabilize a line of sight for that radiant energy system.

Figure 2:
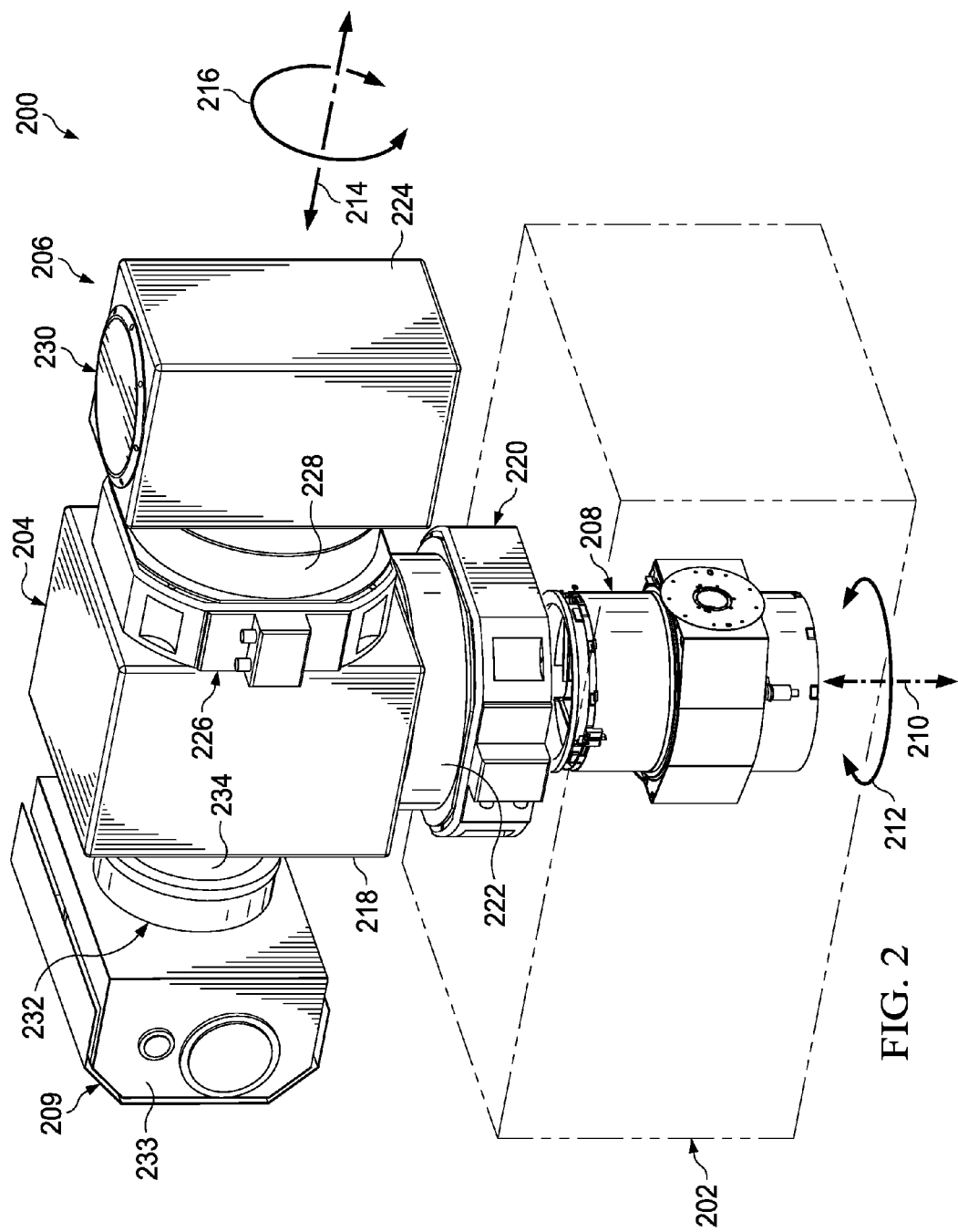
FIG. 2 is a diagrammatic representation of an isometric view of a portion of a radiant energy system in accordance with an illustrative embodiment.

With reference now to FIG. 2, a diagrammatic representation of an isometric view of a portion of a radiant energy system is depicted in accordance with an illustrative embodiment. In this illustrative example, radiant energy system 200 may be an example of one manner in which each of radiant energy system 118, radiant energy system 120, radiant energy system 122, radiant energy system 124, radiant energy system 126, and radiant energy system 128 in FIG. 1 may be implemented.

Radiant energy system 200 may be used to emit a high energy laser (HEL) beam in one illustrative example. The direction in which the high energy laser (HEL) is pointed may be referred to as the line of sight for radiant energy system 200. In this illustrative example, the line of sight for radiant energy system 200 may be defined with respect to both azimuth and elevation.

As depicted, radiant energy system 200 may include housing 202, first rotatable system 204, second rotatable system 206, optical telescope 208, and additional operations system 209. In this illustrative example, housing 202 may be configured for association with a platform (not shown). The platform may take the form of, for example, without limitation, an unmanned aerial vehicle, some other type of vehicle, or some other type of structure.

Depending on the implementation, housing 202 may be located entirely within an interior of the platform, partially within the interior of the platform, or entirely outside of the platform. For example, without limitation, housing 202 may be mounted onto an interior surface of the platform or an exterior surface of the platform.

As used herein, when one component is "associated" with another component, the association is a physical association in the depicted examples. For example, a first component, such as housing 202, may be considered to be associated with a second component, such as a platform, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, at least a portion of first rotatable system 204 may be rotatable about azimuth axis 210 in the direction of arrow 212. At least a portion of second rotatable system 206 may be rotatable about elevation axis 214 in the direction of arrow 216. Azimuth axis 210 and elevation axis 214 are about 90 degrees relative to each other. Rotation about azimuth axis 210 may change an azimuth angle for radiant energy system 200 and rotation about elevation axis 214 may change an elevation angle for radiant energy system 200.

First rotatable system 204 includes first housing 218, first rotary system 220, and first interface unit 222. First rotary system 220 may be used to rotate first housing 218 about azimuth axis 210 to change the azimuth angle of the line of sight for radiant energy system 200.

First rotary system 220 may include at least one of a motor, an encoder, a bearing, or some other type of element or device. In one illustrative example, first rotary system 220 may be implemented using a motorized rotary stage.

First interface unit 222 may be located between first rotary system 220 and first housing 218. Depending on the implementation, first interface unit 222 may be used to connect first rotary system 220 to first housing 218, seal the interface between first rotary system 220 and first housing 218, or both. In some illustrative examples, first interface unit 222 may provide a hermetic seal between first rotary system 220 and first housing 218. First interface unit 222 may include at least one of a bearing, a cable wrap, or some other type of element.

As depicted, second rotatable system 206 is associated with first rotatable system 204. In particular, second rotatable system 206 is associated with first housing 218 of first rotatable system 204 such that rotation of first housing 218 about azimuth axis 210 may, in turn, cause rotation of second rotatable system 206 about azimuth axis 210.

Second rotatable system 206 may not be independently rotatable about azimuth axis 210. However, second rotatable system 206 may be independently rotatable about elevation axis 214 relative to first rotatable system 204.

As depicted, second rotatable system 206 includes second housing 224, second rotary system 226, and second interface unit 228. Second housing 224 may have output element 230. Output element 230 may be the element through which the high energy laser beam generated by radiant energy system 200 is emitted. In this illustrative example, output element 230 takes the form of a piece of glass. In this manner, output element 230 may form a window. However, in other illustrative examples, output element 230 may take the form of an opening in second housing 224 or some other type of physical element.

Second rotary system 226 is associated with first housing 218 of first rotatable system 204. Second rotary system 226 may be used to rotate second housing 224 about elevation axis 214 to change the elevation angle of the line of sight for radiant energy system 200. Similar to first rotary system 220, second rotary system 226 may include at least one of a motor, an encoder, a bearing, or some other type of element or device. In one illustrative example, second rotary system 226 may be implemented using a motorized rotary stage.

Second interface unit 228 may be located between second rotary system 226 and second housing 224. Depending on the implementation, second interface unit 228 may be used to connect second rotary system 226 to second housing 224, seal the interface between second rotary system 226 and second housing 224, or both. In some illustrative examples, second interface unit 228 may provide a hermetic seal between second rotary system 226 and second housing 224. Second interface unit 228 may include at least one of a bearing, a cable wrap, or some other type of element.

The one or more components used to generate the high energy laser beam described above are not shown in FIG. 2. These one or more components may be positioned beneath optical telescope 208. The high energy laser beam may pass through optical telescope 208 into first housing 218. The high energy laser beam may then be reflected into second housing 224 and then further reflected in a direction towards output element 230.

In this illustrative example, additional operations system 209 may be used to perform one or more operations in addition to the emission of high energy laser beam. Additional operations system 209 may include housing 233, third rotary system 232, and third interface unit 234. At least one of a sensor device, a lighting device, a communications system, an imaging system, a microphone, or some other type of device may be associated with housing 233.

Additional operations system 209 is associated with first rotatable system 204 through third rotary system 232 and third interface unit 234. Third rotary system 232 may be implemented in a manner similar to first rotary system 220 and second rotary system 226 described above. Similarly, third interface unit 234 may be implemented in a manner similar to first interface unit 222 and second interface unit 228 described above.

Depending on the implementation, additional operations system 209 may be optional. For example, in some cases, radiant energy system 200 may not include additional operations system 209. In other illustrative examples, additional operations system 209 may be removable from radiant energy system 200.

Figure 3:
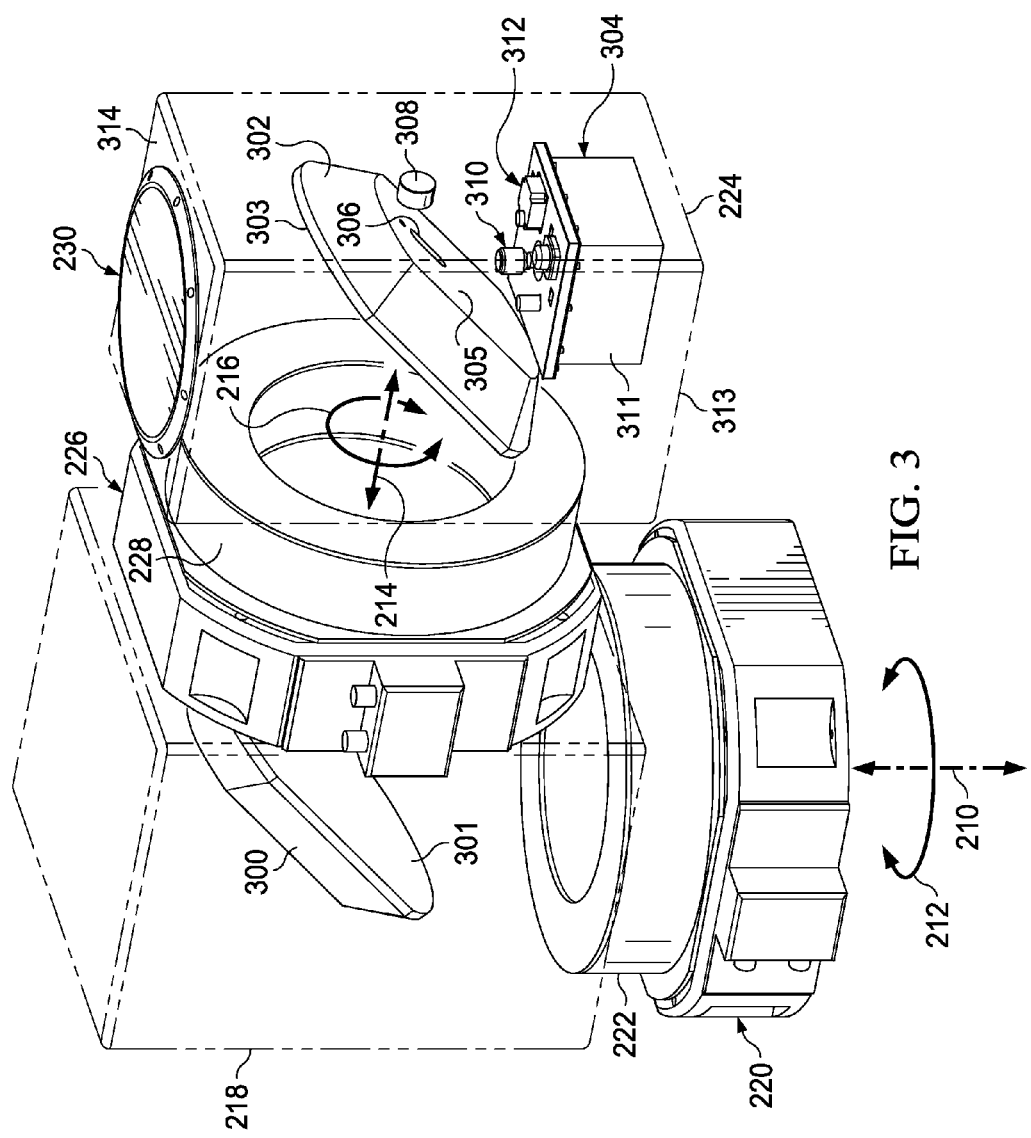
FIG. 3 is a diagrammatic representation of an isometric view of a portion of a radiant energy system partially shown in phantom view in accordance with an illustrative embodiment.

With reference now to FIG. 3, a diagrammatic representation of an isometric view of a portion of radiant energy system 200 from FIG. 2 partially shown in phantom view is depicted in accordance with an illustrative embodiment. As depicted, housing 202, optical telescope 208, and additional operations system 209 are not shown in FIG. 3. Further, first housing 218 and second housing 224 are shown in phantom.

In this illustrative example, first reflector 300 is located within first housing 218. First reflector 300 takes the form of a planar mirror in this example. First reflector 300 has a first surface that is substantially planar. This first surface may be reflective surface 301.

Second reflector 302, inertial reference system 304, reflective element 306, and retroreflector 308 are located within second housing 224. In this illustrative example, second reflector 302 takes the form of a planar mirror. As depicted, second reflector 302 has a second surface that is substantially planar. This second surface may be reflective surface 303. Second reflector 302 may also have back surface 305 in this illustrative example.

Reflective element 306 is associated with back surface 305 of second reflector 302. Reflective element 306 may be associated with back surface 305 such that the reflective surface of reflective element 306 is substantially parallel to reflective surface 303 of second reflector 302.

In one illustrative example, reflective element 306 takes the form of a reflective coating that is applied on a portion of back surface 305 of second reflector 302. In other illustrative examples, reflective element 306 may take the form of a planar mirror that is attached to back surface 305.

Inertial reference system 304 includes reference beam generator 310, base 311, and reference sensor system 312. In this illustrative example, reference beam generator 310 may generate and emit a reference beam towards reflective element 306 that may be used to stabilize the line of sight of radiant energy system 200.

Reference beam generator 310 is associated with base 311. Base 311 is fixedly associated with wall 313 of second housing 224. Reference beam generator 310 may be inertially stabilized with respect to an inertial reference frame.

This inertial reference frame may be a frame of reference that is not accelerating. Reference beam generator 310 may include any number of gyroscopic elements, gimbal elements, or combination thereof for use in inertially stabilizing reference beam generator 310 with respect to an inertial reference frame. In this manner, reference beam generator 310 may be movable relative to base 311 such that reference beam generator 310 may be inertially stabilized even when base 311 is not inertially stabilized.

Reference sensor system 312 may be associated with at least one of reference beam generator 310 or base 311. In one illustrative example, reference sensor system 312 is used to measure an angular position of reference beam generator 310. In other illustrative examples, reference sensor system 312 may be used to measure the angular position of reference beam generator 310 and compute a relative difference between the angular position of reference beam generator 310 and an angular position for second reflector 302. Depending on the implementation, reference sensor system 312 may include one or more sensor devices.

The reference beam generated by reference beam generator 310 may be directed towards and reflected off of reflective element 306 onto retroreflector 308. As depicted, retroreflector 308 is associated with wall 314 of second housing 224.

Figure 4:
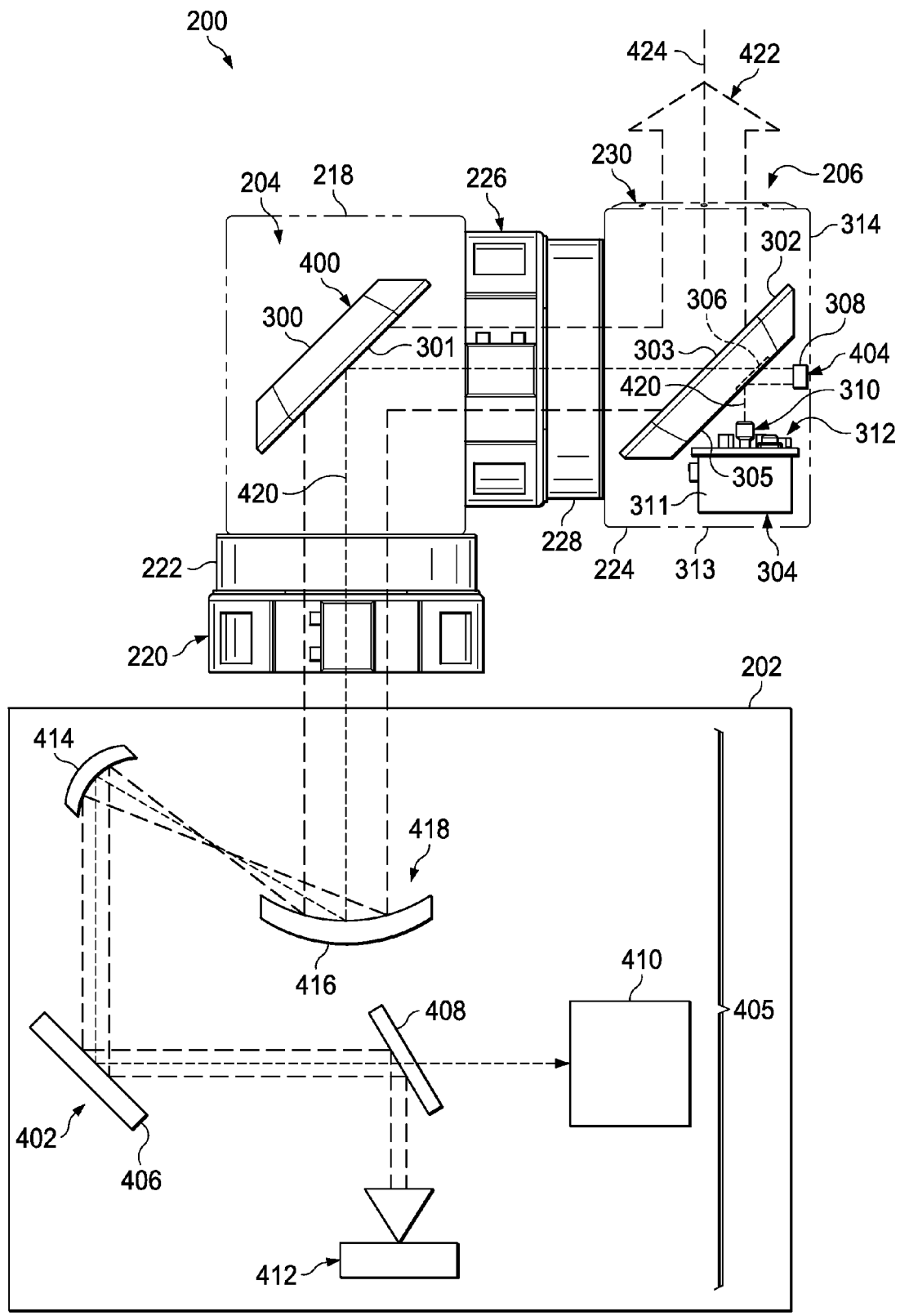
FIG. 4 is a diagrammatic representation of a side view of a portion of a radiant energy system partially shown in phantom view in accordance with an illustrative embodiment.

With reference now to FIG. 4, a diagrammatic representation of a side view of a portion of radiant energy system 200 from FIG. 2 partially shown in phantom view is depicted in accordance with an illustrative embodiment. The different components of radiant energy system 200 form first optical system 400, second optical system 402, and injection system 404.

In this illustrative example, first optical system 400 is formed by first reflector 300 and second reflector 302. First rotatable system 204 and second rotatable system 206 may also be considered part of first optical system 400. Second optical system 402 is formed by components within housing 202.

As depicted, plurality of components 405 are present within housing 202 in this illustrative example. Plurality of components 405 include fast steering mirror (FSM) 406, optical element 408, position sensing device (PSD) 410, high energy laser beam generator 412, mirror 414, and mirror 416. In this illustrative example, optical element 408, fast steering mirror 406, mirror 414, mirror 416, first reflector 300, and second reflector 302 form optical path 418.

Second optical system 402 may be formed by fast steering mirror 406 and position sensing device 410. In some cases, optical element 408 may also be considered part of second optical system 402. In some illustrative examples, mirror 414 and mirror 416 may also be considered part of second optical system 402. Injection system 404 is formed by retroreflector 308 and reflective element 306.

In this illustrative example, reference beam generator 310 generates reference beam 420. High energy laser beam generator 412 generates high energy laser beam 422. Radiant energy system 200 emits high energy laser beam 422. Reference beam 420 may be comprised of electromagnetic radiation having a different frequency and wavelength than the electromagnetic radiation that forms high energy laser beam 422.

High energy laser beam 422 propagates along optical path 418. Injection system 404 is used to send reference beam 420, which is generated outside of optical path 418, into optical path 418. In other words, injection system 404 may "inject" reference beam 420 into optical path 418.

In particular, reference beam 420 is emitted in a selected direction towards reflective element 306. Reflective element 306 reflects reference beam 420 onto retroreflector 308 along a first vector. In this illustrative example, retroreflector 308 is an optical device that reflects reference beam 420 back towards second reflector 302 along a second vector that is substantially parallel to but opposite in direction from the first vector.

Retroreflector 308 reflects reference beam 420 back towards and through second reflector 302, which sends reference beam 420 into optical path 418. In one illustrative example, reference beam 420 reflected by retroreflector 308 may pass through an opening (not shown) through second reflector 302. In other illustrative examples, second reflector 302 may be comprised of one or more materials that are capable of reflecting wave fronts having the frequency of high energy laser beam 422 but permitting transmission of wave fronts having the frequency of reference beam 420.

Once reference beam 420 enters optical path 418, reference beam 420 may encounter each of the plurality of optical elements that make up optical path 418. In particular, the reflected reference beam 420 passes through second reflector 302 and propagates towards first reflector 300. First reflector 300 reflects reference beam 420 towards optical telescope 208 shown in FIG. 2 and into housing 202.

Within housing 202, reference beam 420 is reflected off of mirror 416 and onto mirror 414. Reference beam 420 is then reflected off of mirror 414 onto fast steering mirror 406. Reference beam 420 is reflected off of fast steering mirror 406 through optical element 408 and onto position sensing device 410. Position sensing device 410 may be used to measure the angle of incidence of reference beam 420 on position sensing device 410. In this illustrative example, optical element 408 may be comprised of one or materials that are capable of reflecting wave fronts having the frequency of high energy laser beam 422 but permitting transmission of wave fronts having the frequency of reference beam 420.

High energy laser beam 422 may be emitted from high energy laser beam generator 412 towards optical element 408. Optical element 408 reflects high energy laser beam 422 onto fast steering mirror 406, which, in turn, reflects high energy laser beam 422 onto mirror 414. Mirror 414 reflects high energy laser beam 422 onto mirror 416, which then reflects high energy laser beam 422 through optical telescope 208 shown in FIG. 2 and towards first reflector 300. First reflector 300 reflects high energy laser beam 422 onto second reflector 302, which, in turn, reflects high energy laser beam 422 towards output element 230. Output element 230 may be comprised of one or more materials that enable wave fronts having the frequency of high energy laser beam 422 to pass through output element 230. In this manner, high energy laser beam 422 may be emitted through output element 230.

First optical system 400 may be used to position line of sight 424 of high energy laser beam 422 based on reference beam 420. In particular, first rotary system 220 and second rotary system 226 are used to control line of sight 424 of radiant energy system 200 with respect to azimuth and elevation, respectively. Reference sensor system 312 may be used to determine when line of sight 424 needs to be rotated in azimuth, elevation, or both to substantially maintain alignment between line of sight 424 and reference beam 420.

In one illustrative example, reference sensor system 312 measures the angular position of reference beam generator 310. The angular position of reference beam generator 310 controls the direction in which reference beam 420 is emitted.

A control system (not shown) may compute a relative difference between the angular positions of reference beam generator 310 and second reflector 302. As one illustrative example, an azimuth deviation and an elevation deviation between the angular positions of reference beam generator 310 and second reflector 302 may be computed. When the azimuth deviation is not within a selected range of zero, first rotary system 220 is used to rotate line of sight 424 with respect to azimuth axis 210 to correct for this azimuth deviation. Rotating first rotary system 220 about azimuth axis 210 rotates first reflector 300 about azimuth axis 210, which, in turn, rotates second reflector 302 and line of sight 424 about azimuth axis 210.

Similarly, when the elevation deviation is not within a selected range of zero, second rotary system 226 is used to rotate line of sight 424 with respect to elevation axis 214 to correct for this elevation deviation. Rotating second rotary system 226 about elevation axis 214 rotates second reflector 302 and thereby line of sight 424 about elevation axis 214.

Rotation of first housing 218, and thereby first reflector 300, by first rotary system 220 may not affect the azimuth angle of reference beam generator 310. Further, rotation of second housing 224, and thereby second reflector 302, by second rotary system 226 may not affect the elevation angle of reference beam generator 310. In this manner, reference beam generator 310 may remain inertially stabilized with respect to the inertial reference frame.

Second optical system 402 may be used to stabilize line of sight 424 of high energy laser beam 422 to counteract a number of disturbances created within optical path 418. For example, without limitation, as reference beam 420 encounters each of the plurality of optical elements that make up optical path 418, reference beam 420 effectively "samples" any disturbances created by the position or movement of each optical element. In this manner, measuring the angle of incidence of reference beam 420 at position sensing device 410 captures any disturbances created within optical path 418. For example, measuring the angle of incidence of reference beam 420 at position sensing device 410 may capture any undesired jitter within optical path 418 that may alter line of sight 424 of high energy laser beam 422 in an undesired manner.

The desired angle of incidence for reference beam 420 based on the selected direction in which reference beam 420 is emitted may be known at the control system (not shown). Any deviation of the measured angle of incidence for reference beam 420 from this desired angle of incidence that is outside of selected tolerances may be corrected using fast steering mirror 406. In particular, fast steering mirror 406 may be quickly and easily steered to adjust line of sight 424 of high energy laser beam 422 based on the deviation between the desired angle of incidence and the measured angle of incidence.

Using reference beam 420 in this manner may improve the stabilization of line of sight 424. First optical system 400 may be used to position line of sight 424 of high energy laser beam 422 and to maintain alignment between high energy laser beam 422 and reference beam 420 given low frequency disturbances. These disturbances may be caused by, for example, without limitation, changing the direction in which reference beam 420 is emitted. Second optical system 402 may be used to stabilize line of sight 424 of high energy laser beam 422 using reference beam 420 to counteract higher frequency disturbances that are created within optical path 418.

The improved stabilization of line of sight 424 that may be achieved using reference beam 420 in the manner as described above may improve the overall performance of radiant energy system 200. In particular, the overall performance of radiant energy system 200 may be improved without increasing the weight, size, or complexity of radiant energy system 200 more than desired.

Further, the improved stabilization of line of sight 424 may enable beams of higher frequencies to be emitted from radiant energy system 200. Still further, the improved stabilization of line of sight 424 may enable radiant energy system 200 to be used in environments where significant vibration disturbances may be caused, to be used on platforms at higher elevations, and to be used in harsher weather conditions.

Mirror 414, mirror 416, and optical element 408 may together be referred to as an off-axis parabola (OAP). Using first reflector 300 and second reflector 302, which form a coelostat-type reflector system, enables using this type of off-axis parabola as a beam expander for high energy laser beam 422. An off-axis parabola has tight alignment tolerances that may be difficult or not possible to achieve using conventional systems due to the flexing of the telescope in conventional systems. Using a coelostat-type reflector system enables a simpler telescope to be housed in a non-rotating space, such as within housing 202. This type of overall system enables an off-axis parabola to be used that does not obscure high energy laser beam 422 and that preserves energy in high energy laser beam 422.

The illustrations of environment 100 in FIG. 1 and radiant energy system 200 in FIGS. 2-4 are not meant to imply physical or architectural limitations to the manner in which an illustrative embodiment may be implemented. Other components in addition to or in place of the ones illustrated may be used. Some components may be optional.

The different components shown in FIGS. 1-4 may be illustrative examples of how components shown in block form in FIG. 5 below can be implemented as physical structures. Additionally, some of the components in FIGS. 1-4 may be combined with components in FIG. 5, used with components in FIG. 5, or a combination of the two.

Figure 5:
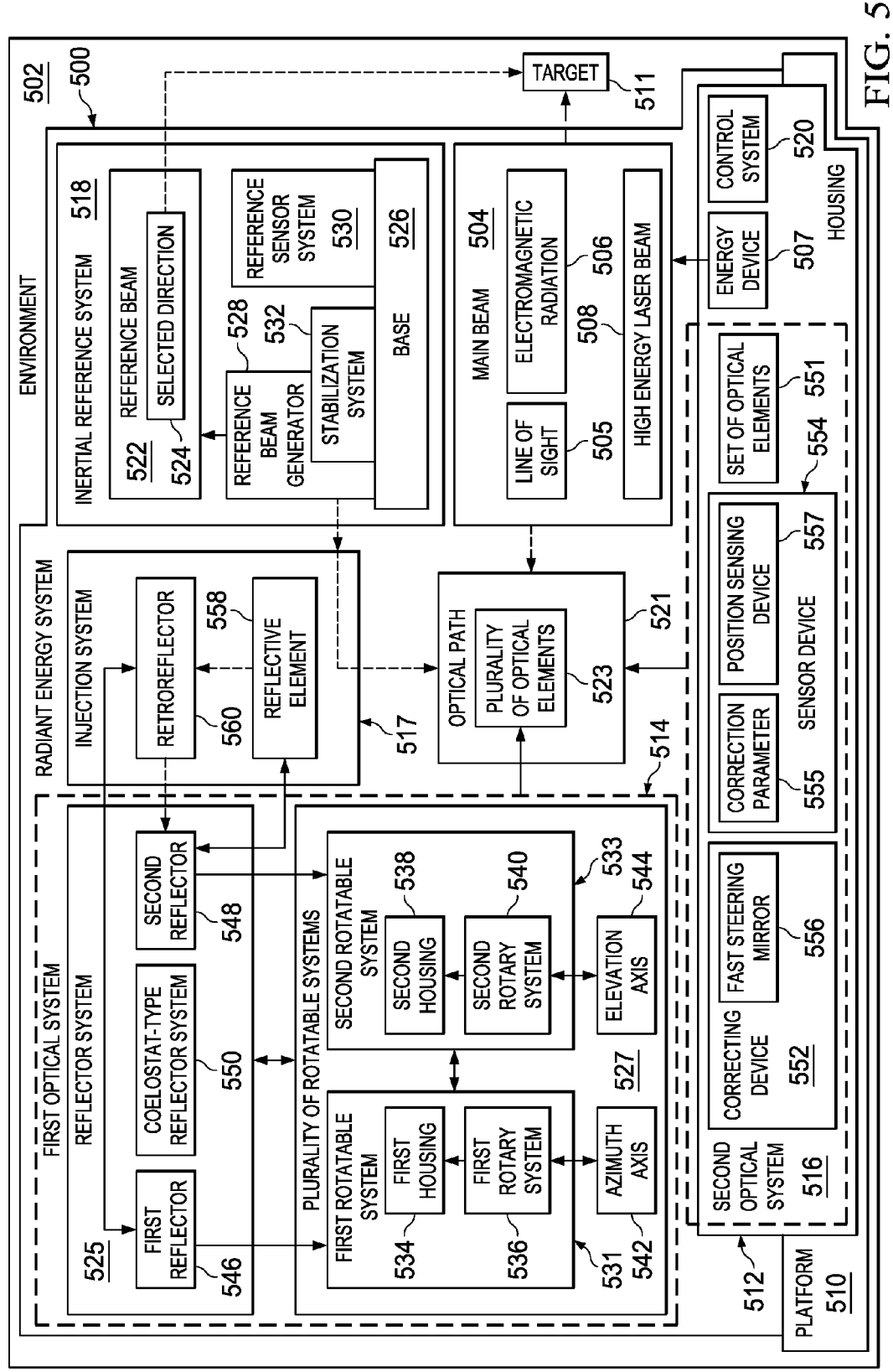
FIG. 5 is a block diagram of a radiant energy system in accordance with an illustrative embodiment.

With reference to FIG. 5, a block diagram of a radiant energy system is depicted in accordance with an illustrative embodiment. Radiant energy system 500 may be used in, for example, environment 502.

Radiant energy system 118, radiant energy system 120, radiant energy system 122, radiant energy system 124, radiant energy system 126, and radiant energy system 128 in FIG. 1 may be examples of implementations for radiant energy system 500. Further, radiant energy system 200 described in FIGS. 2-4 may be an example of one implementation for radiant energy system 500.

Depending on the implementation, radiant energy system 500 may emit or receive main beam 504 of electromagnetic radiation 506 using energy device 507. Electromagnetic radiation 506 may take the form of visible light, infrared radiation, ultraviolet radiation, microwaves, radio waves, thermal radiation, gamma rays, X-rays, or some other type of electromagnetic radiation.

When radiant energy system 500 is used to emit main beam 504, energy device 507 generates electromagnetic radiation 506 and emits electromagnetic radiation 506 in the form of main beam 504. As one illustrative example, energy device 507 may be used to generate and emit main beam 504 in the form of high energy laser (HEL) beam 508. High energy laser beam 508 may be, for example, without limitation, a collimated laser beam. High energy laser beam 422 in FIG. 4 may be an example of one implementation for high energy laser beam 508. Further, high energy laser beam generator 412 in FIG. 4 may be an example one type of energy device 507.

When radiant energy system 500 is used to receive main beam 504, energy device 507 captures electromagnetic radiation 506 that is received and propagated through radiant energy system 500 in the form of main beam 504. In one illustrative example, main beam 504 may be comprised of visible light from a scene that is captured by energy device 507 for imaging or tracking purposes.

Main beam 504 may have line of sight 505. Line of sight 505 may be the angular direction defined in azimuth and elevation towards which main beam 504 is directed or from which main beam 504 is received, depending on the implementation.

As depicted, radiant energy system 500 may be associated with platform 510. Platform 510 may take a number of different forms. Platform 510 may take the form of an unmanned aerial vehicle, an aircraft, a ground vehicle, a telescoping structure, a building, a robotic arm, a robotic vehicle, or some other type of vehicle, system, or structure. Each unmanned aerial vehicle of the group of unmanned aerial vehicles 104 in FIG. 1 may be an example of one implementation for platform 510.

Depending on the implementation, radiant energy system 500 may be used to perform any of a number of different types of operations. For example, radiant energy system 500 may be used to at least one of: perform surveillance of environment 502, detect target 511, track target 511, generate images of environment 502, generate images of target 511, record video of target 511, or some other type of operation. In some illustrative examples, radiant energy system 500 may take the form of a weapons system, such as a laser weapon system. For example, without limitation, main beam 504 of electromagnetic radiation 506 may be used as a weapon against target 511.

In this illustrative example, radiant energy system 500 may include first optical system 514, second optical system 516, injection system 517, inertial reference system 518, and control system 520. First optical system 400, second optical system 402, and injection system 404 in FIG. 4 may be examples of implementations for first optical system 514, second optical system 516, and injection system 517, respectively.

In some cases, radiant energy system 500 may also include housing 512. Housing 202 in FIG. 2 and in FIG. 4 may be an example of one implementation for housing 512. Depending on the implementation, at least one of first optical system 514, second optical system 516, injection system 517, inertial reference system 518, or control system 520 may be associated with housing 512. In one illustrative example, housing 512 may be associated with platform 510.

At least a portion of first optical system 514 and at least a portion of second optical system 516 form optical path 521 for main beam 504. Optical path 521 may include plurality of optical elements 523. Plurality of optical elements 523 may include any number of reflectors, mirrors, steering mirrors, reflective elements, telescopes, lenses, or other types of optical elements.

First optical system 514 and second optical system 516 are used to position and stabilize, respectively, line of sight 505 of main beam 504 using reference beam 522. Reference beam 522 may be generated and emitted using inertial reference system 518. In these illustrative examples, inertial reference system 518 is located outside of optical path 521.

In one illustrative example, inertial reference system 518 includes base 526, reference beam generator 528, and reference sensor system 530. In one illustrative example, both reference beam generator 528 and reference sensor system 530 are associated with base 526. In some cases, at least a portion of reference beam generator 528 may be housed within base 526.

Reference beam generator 528 generates and emits reference beam 522 in selected direction 524. Reference beam 522 may have a different frequency and wavelength than main beam 504. Further, reference beam 522 may be many times narrower than main beam 504.

Selected direction 524 may be a selected angular direction defined using an azimuth angle and an elevation angle. Reference beam generator 528 is capable of precisely pointing reference beam 522 in selected direction 524. In some illustrative examples, selected direction 524 may change over time.

For example, without limitation, when radiant energy system 500 is used to track target 511 that is moving within environment 502, selected direction 524 may be adjusted to follow the movement of target 511. In particular, a current position of target 511 relative to an inertial reference frame may be identified. Selected direction 524 is selected such that reference beam 522 is pointed at the current position of target 511 with a desired level of precision. As the position of target 511 within environment 502 changes as target 511 moves, selected direction 524 for reference beam 522 is changed accordingly to follow the moving target 511.

Stabilization system 532 inertially stabilizes reference beam 522 in selected direction 524. In particular, stabilization system 532 inertially stabilizes reference beam generator 528, and thereby reference beam 522 generated by reference beam generator 528, with respect to an inertial reference frame. Stabilization system 532 may include at least one of a gyroscope, a gimbal element, an actuator, or some other type of element or device that may be used to inertially stabilize reference beam generator 528, and thereby reference beam 522.

In these illustrative examples, stabilization system 532 may inertially stabilize reference beam generator 528 independently of base 526. In this manner, reference beam generator 528 may be movable relative to base 526. Stabilization system 532 enables reference beam 522 to be inertially stabilized in selected direction 524 against undesired disturbances. These disturbances may be caused by, for example, without limitation, at least one of movement of radiant energy system 500, movement of platform 510 with which radiant energy system 500 is associated, movement of base 526, movement of target 511, weather conditions, or some other type of factor.

In one illustrative example, selected direction 524 for reference beam 522 may be selected by control system 520. Control system 520 may include any number of controllers, processor units, integrated circuits, microprocessors, or other types of data processing units.

In one illustrative example, control system 520 uses data received from any number of devices to identify a current position of target 511. For example, control system 520 may receive data from a camera device that generates one or more images based on visible light received in main beam 504. Control system 520 uses these images to identify the current position of target 511.

Control system 520 may also receive data from reference sensor system 530 of inertial reference system 518. In one illustrative example, reference sensor system 530 measures an angular position of reference beam generator 528. The measured angular position of reference beam generator 528 is a measure of selected direction 524 of reference beam 522. In other illustrative examples, reference sensor system 530 may generate other types of measurements. Depending on the implementation, reference sensor system 530 may be comprised of one or more sensors.

Control system 520 uses the current position of target 511 and the measured angular position of reference beam generator 528 to determine whether selected direction 524 of reference beam 522 should be changed. If selected direction 524 needs to be changed, control system 520 generates a number of commands for rotating reference beam generator 528. Reference beam generator 528 receives these commands and changes selected direction 524 of reference beam 522 with respect to at least one of azimuth or elevation such that reference beam 522 follows target 511.

First optical system 514 may be used to position line of sight 505 of main beam 504 based on selected direction 524 of reference beam 522. In other words, first optical system 514 may be used to substantially maintain alignment between main beam 504 and reference beam 522.

In one illustrative example, first optical system 514 includes plurality of rotatable systems 527 and reflector system 525. Plurality of rotatable systems 527 may include, for example, without limitation, first rotatable system 531 and second rotatable system 533. First rotatable system 204 and second rotatable system 206 in FIG. 2 may be examples of implementations for first rotatable system 531 and second rotatable system 533, respectively.

As depicted, first rotatable system 531 includes first housing 534 and first rotary system 536. First housing 218 and first rotary system 220 in FIG. 2 may be examples of implementations for first housing 534 and first rotary system 536, respectively. Second rotatable system 533 includes second housing 538 and second rotary system 540. Second housing 224 and second rotary system 226 in FIG. 2 may be examples of implementations for second housing 538 and second rotary system 540, respectively.

First housing 534 and second housing 538 may be implemented in a number of different ways. For example, each of these housings may be implemented as a rectangular drum, a cylindrical drum, or some other type of structure. Second housing 538 may be rotatably associated with first housing 534.

First rotary system 536 may be used to rotate first housing 534, and thereby any components located within first housing 534, about azimuth axis 542. Second rotary system 540 may be used to rotate second housing 538, and thereby any components located within second housing 538, about elevation axis 544. Azimuth axis 542 and elevation axis 544 may be substantially orthogonal.

Rotation of first housing 534 in azimuth may result in the same corresponding rotation of second housing 538. However, second housing 538 may be rotated in elevation independently of first housing 534.

Reflector system 525 is associated with plurality of rotatable systems 527. In one illustrative example, reflector system 525 includes first reflector 546 and second reflector 548. First reflector 300 and second reflector 302 in FIG. 3 may be examples of implementations for first reflector 546 and second reflector 548, respectively.

In one illustrative example, first reflector 546 and second reflector 548 each take the form of a planar mirror. In particular, each of first reflector 546 and second reflector 548 may have reflective surfaces that are substantially planar. Consequently, reflector system 525 may be referred to as coelostat-type reflector system 550.

First reflector 546 and second reflector 548 may be associated with first housing 534 and second housing 538, respectively. For example, first reflector 546 and second reflector 548 may be located within first housing 534 and second housing 538, respectively.

In this manner, rotation of first housing 534 by first rotary system 536 about azimuth axis 542 causes the same rotation of first reflector 546 and second reflector 548 in azimuth. Similarly, rotation of second housing 538 about elevation axis 544 causes the same rotation of second reflector 548 in elevation.

In one illustrative example, inertial reference system 518 may be located within second housing 538. In particular, base 526 of inertial reference system 518 may be fixedly associated with second housing 538. Rotation of second housing 538 about elevation axis 544 causes the same rotation of base 526 of inertial reference system 518. However, stabilization system 532 is configured to stabilize reference beam generator 528 such that reference beam 522 remains inertially stabilized in selected direction 524 independently of any movement of second housing 538 and base 526.

Second optical system 516 includes set of optical elements 551, correcting device 552, and sensor device 554. As used herein, a "set of optical elements" may include zero, one, or more optical elements. In this manner, set of optical elements 551 may be an empty set in some cases. Mirror 414, mirror 416, and optical element 408 in FIG. 4 may be an example of one implementation for set of optical elements 551.

In one illustrative example, plurality of optical elements 523 that form optical path 521 for main beam 504 includes correcting device 552, set of optical elements 551, first reflector 546, and second reflector 548. In some illustrative examples, plurality of optical elements 523 may include other optical elements such as, but not limited to, optical telescope 208 shown in FIG. 2. Depending on the implementation, main beam 504 may encounter each of plurality of optical elements 523 in different ways.

In one illustrative example, main beam 504 is generated by energy device 507 and directed towards first reflector 546 after encountering correcting device 552 and each of set of optical elements 551. Main beam 504 may then be reflected off of first reflector 546 onto second reflector 548, and then reflected off of second reflector 548 towards a target point of interest with respect to an inertial reference frame. The target point of interest may be, for example, the position of target 511 with respect to the inertial reference frame. As described above, rotating first reflector 546 in azimuth, rotating second reflector 548 in elevation, or both changes line of sight 505 of main beam 504.

In another illustrative example, electromagnetic radiation 506 may be received in the form of main beam 504 at second reflector 548. Main beam 504 may then be reflected off of second reflector 548 onto first reflector 546. Main beam 504 is then reflected off of first reflector 546 and then directed towards energy device 507 after encountering each of set of optical elements 551 and correcting device 552.

First optical system 514 is used to position line of sight 505 of main beam 504 based on reference beam 522. In particular, first optical system 514 ensures that line of sight 505 remains substantially aligned with selected direction 524 in which reference beam 522 is directed within selected tolerances.

As one illustrative example, first optical system 514 may be used to move line of sight 505 of main beam 504 such that main beam 504 follows reference beam 522. For example, without limitation, control system 520 may use the measured angular position of reference beam generator 528 provided by reference sensor system 530 of inertial reference system 518 and a measurement of the angular position of second reflector 548 to control first optical system 514. The measurement of the angular position of second reflector 548 may be provided by, for example, without limitation, a sensor device that is associated with one of second reflector 548 and second rotatable system 533.

Control system 520 may compute a relative difference between the angular positions of reference beam generator 528 and second reflector 548. This relative difference may provide a measure of the relative offset between selected direction 524 in which reference beam 522 is pointing and line of sight 505 of main beam 504.

If at any given point in time this relative difference is outside of selected tolerances, control system 520 may control at least one of first rotary system 536 or second rotary system 540 to rotate at least one of first reflector 546 or second reflector 548, respectively, to thereby rotate line of sight 505 of main beam 504. In this manner, line of sight 505 for main beam 504 may maintain alignment with selected direction 524 of reference beam 522 within selected tolerances.

Second optical system 516 is used to stabilize line of sight 505 of main beam 504 using reference beam 522 to counteract a number of disturbances created within optical path 521 of main beam 504. Reference beam 522 is used to stabilize main beam 504 because reference beam 522 is already stabilized within selected tolerances by stabilization system 532. Stabilizing main beam 504 using a stabilization system similar to stabilization system 532 would require a greater number of components than desired and would add an undesired level of complexity to radiant energy system 500. Further, these additional components would increase the weight of radiant energy system 500 more than desired.

Thus, the inertial stability of reference beam 522 provided by stabilization system 532 is utilized to stabilize main beam 504. In particular, injection system 517 is used to send reference beam 522 into optical path 521 at one end of optical path 521. In one illustrative example, injection system 517 includes reflective element 558 and retroreflector 560. Reference beam 522 emitted by reference beam generator 528 is directed towards reflective element 558.

Reflective element 558 may be associated with second reflector 548. In one illustrative example, reflective element 558 is associated with a back surface of second reflector 548. Depending on the implementation, reflective element 558 may take the form of a planar mirror attached to the back surface of second reflector 548 or a reflective coating that is applied onto the back surface of second reflector 548. In other illustrative examples, reflective element 558 may be a portion of second reflector 548 that is comprised of a different type of reflective material than a remaining portion of second reflector 548.

Reflective element 558 reflects reference beam 522 onto retroreflector 560, which, in turn, reflects reference beam 522 back towards and through second reflector 548. As one illustrative example, the reflected reference beam 522 may be reflected from retroreflector 560 through an opening that passes through second reflector 548. In another illustrative example, reference beam 522 may pass through a semi-transparent portion of second reflector 548 and continue on towards first reflector 546.

Directing reference beam 522 such that reference beam 522 passes through second reflector 548 sends reference beam 522 into optical path 521. In other words, reference beam 522 is "injected" into optical path 521. Once reference beam 522 enters optical path 521, reference beam 522 continues to propagate towards first reflector 546, which reflects reference beam 522 towards the various components of second optical system 516.

In one illustrative example, reference beam 522 is directed from first reflector 546, through set of optical elements 551, onto correcting device 552. In one illustrative example, correcting device 552 may take the form of fast steering mirror (FSM) 556. Correcting device 552 directs reference beam 522 towards sensor device 554.

Sensor device 554 measures correction parameter 555 for reference beam 522. In one illustrative example, sensor device 554 takes the form of position sensing device (PSD) 557. With position sensing device 557, correction parameter 555 may be the angle of incidence of reference beam 522 on position sensing device 557.

Sensor device 554 is positioned outside of optical path 521. In this manner, reference beam 522 is injected into optical path 521 at one end of optical path 521 and then correction parameter 555 is measured after reference beam 522 has encountered each of plurality of optical elements 523 in optical path 521. In this manner, reference beam 522 may sample each of plurality of optical elements 523 such that the effect of any disturbances caused by any of these optical elements may be captured in the measured correction parameter 555 generated by sensor device 554.

Control system 520 may receive the measured correction parameter from sensor device 554. Control system 520 determines whether there is a deviation of the measured correction parameter from a desired correction parameter that is outside of selected tolerances. The desired correction parameter may be, for example, a desired value for correction parameter 555 based on selected direction 524 for reference beam 522.

As one illustrative example, when correction parameter 555 is angle of incidence, control system 520 may determine whether the measured angle of incidence has deviated from the desired angle of incidence outside of a selected range of zero degrees. This selected range may be, for example, without limitation, within about two degrees of zero degrees, within about one degree of zero degrees, within about 0.5 degrees of zero degrees, within about 0.25 degrees of zero degrees, within about 0.10 degrees of zero degrees, or some other range.

A difference between the measured correction parameter and the desired correction parameter that is not within the selected range indicates that one or more undesired disturbances are present within the optical path 521. Consequently, if the difference between the measured correction parameter and the desired correction parameter is not within the selected range, control system 520 controls correcting device 552 to correct for this difference.

For example, without limitation, the angular position of correcting device 552 may be changed in at least one of azimuth or elevation to change line of sight 505 of main beam 504. Changing the angular position of correcting device 552 also changes the angle of incidence of reference beam 522 on sensor device 554. Implementing correcting device 552 using fast steering mirror 556 may enable corrections to be made more quickly than is possible using, for example, first rotatable system 531 and second rotatable system 533. Fast steering mirror 556 may be capable of being steered at higher frequencies than the frequencies at which first rotary system 536 and second rotary system 540 may be operated.

Stabilizing main beam 504 using reference beam 522 in the manner described above may improve the overall performance of radiant energy system 500. In particular, by stabilizing main beam 504 using reference beam 522, undesired jitter in line of sight 505 caused by the undesired disturbances within optical path 521 may be reduced. Further, this type of stabilization may enable main beam 504 to have higher frequencies, while maintaining reduced jitter in line of sight 505 of main beam 504.

The improved overall performance of radiant energy system 500 may enable radiant energy system 500 to be used in various applications including, but not limited to, astronomy, solar power collection, imaging, weapons targets, and target tracking. Line of sight 505 may be stabilized against undesired exogenous disturbances arising due to motion of platform 510, rigid body and structural dynamics associated with platform 510, motion of target 511, atmospheric conditions, and other types of factors. Further, by stabilizing line of sight 505 of main beam 504 based on reference beam 522 that is inertially stabilized within selected tolerances, stiffer mechanization may be enabled to reduce undesired structural dynamics.

The illustration of radiant energy system 500 in FIG. 5 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 6:
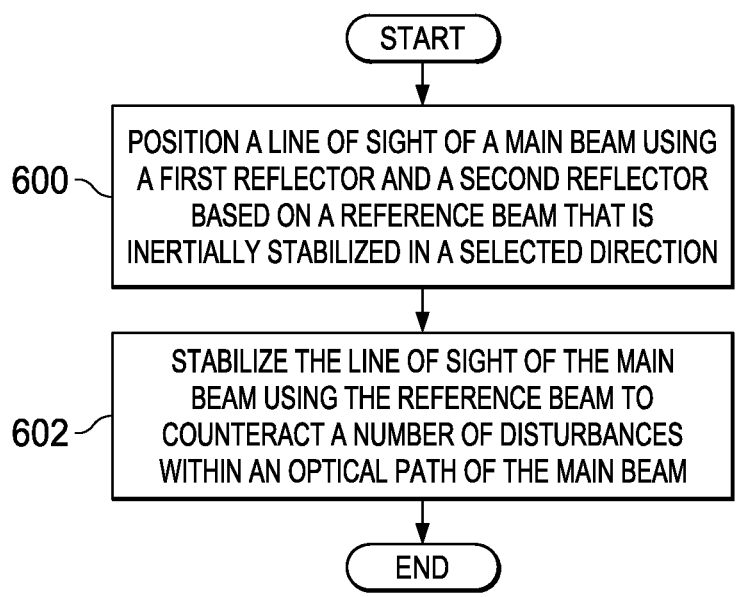
FIG. 6 is a flowchart of a process for managing a line of sight for a radiant energy system in accordance with an illustrative embodiment.

With reference now to FIG. 6, a flowchart of a process for managing a line of sight for a radiant energy system is depicted in accordance with an illustrative embodiment. The process illustrated in FIG. 6 may be used to manage line of sight 505 for radiant energy system 500 in FIG. 5.

The process begins by positioning a line of sight of a main beam using a first reflector and a second reflector based on a reference beam that is inertially stabilized in a selected direction (operation 600). In one illustrative example, the first reflector and the second reflector used in operation 600 may be planar mirrors that form a coelostat-type reflector system. Further, the line of sight of the main beam is stabilized using the reference beam to counteract a number of disturbances within an optical path of the main beam (operation 602), with the process terminating thereafter.

Figure 7:
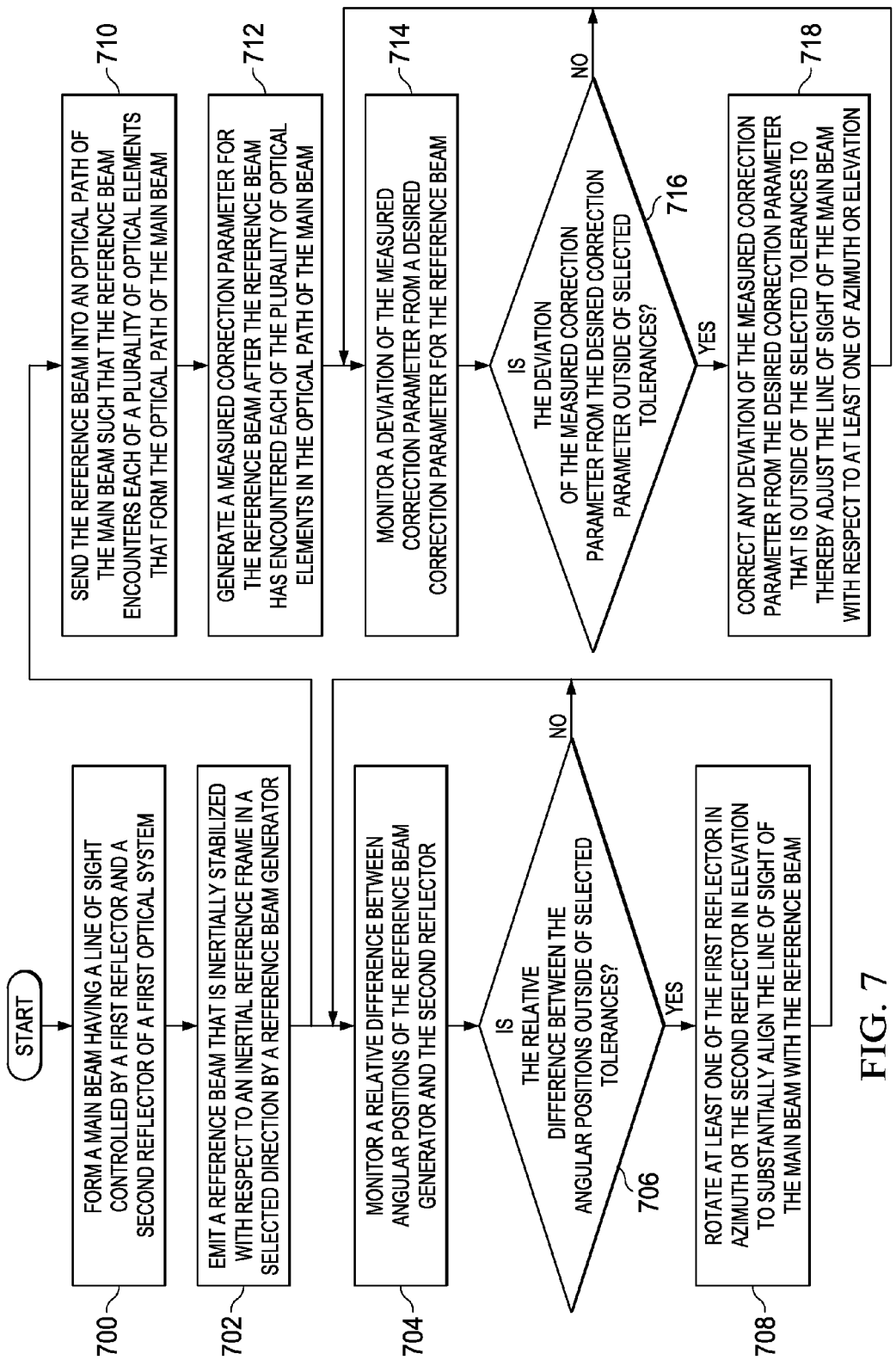
FIG. 7 is a flowchart of a process for managing a line of sight for a radiant energy system in accordance with an illustrative embodiment.

With reference now to FIG. 7, a flowchart of a process for managing a line of sight for a radiant energy system is depicted in accordance with an illustrative embodiment. The process illustrated in FIG. 7 may be used to manage line of sight 505 of main beam 504 in FIG. 5.

The process may begin by forming a main beam having a line of sight controlled by a first reflector and a second reflector of a first optical system (operation 700). Operation 700 may be performed in a number of different ways. In one illustrative example, operation 700 may be performed by emitting a main beam of electromagnetic radiation that has a line of sight that is determined by the azimuth angle of the first reflector and the elevation angle of the second reflector. The first reflector and the second reflector may be planar mirrors.

In another illustrative example, operation 700 may be performed by receiving electromagnetic radiation in a manner that forms a main beam having a line of sight that is determined by the azimuth angle of the first reflector and the elevation angle of the second reflector. As one illustrative example, the electromagnetic radiation may take the form of visible light received in a manner that forms a main beam.

Next, a reference beam that is inertially stabilized with respect to an inertial reference frame is emitted in a selected direction by a reference beam generator (operation 702). This selected direction may change over time. For example, selected direction may be selected such that the reference beam is pointed at a current position of a target. When the target is a moving target, the selected direction in which the reference beam is emitted may be adjusted such that the reference beam substantially follows the target.

A relative difference between angular positions of the reference beam generator and the second reflector is monitored (operation 704). These angular positions may each be defined by an azimuth angle and an elevation angle. In this manner, the relative difference may be defined by an azimuth deviation and an elevation deviation.

A determination is made as to whether the relative difference between the angular positions is outside of selected tolerances (operation 706). A relative difference that is outside of selected tolerances may indicate that the line of sight of the main beam is not substantially aligned with the reference beam.

In one illustrative example, the relative difference may be considered outside of selected tolerances when the relative difference is not within a selected range of zero degrees. For example, the relative difference may be considered outside of selected tolerances when at least one of the azimuth angle deviation or the elevation angle deviation is not substantially zero degrees.

With reference to operation 706, if the relative difference is not outside of selected tolerances, the process returns to operation 704 as described above. Otherwise, at least one of the first reflector is rotated in azimuth or the second reflector is rotated in elevation to substantially align the line of sight of the main beam with the reference beam (operation 708), with the process then returning to operation 704 as described above. In this manner, alignment between the line of sight of the main beam and the selected direction of the reference beam may be substantially maintained over time.

Additionally, the reference beam that is generated in operation 702 may be sent into an optical path of the main beam such that the reference beam encounters each of a plurality of optical elements that form the optical path of the main beam (operation 710). Thereafter, a measured correction parameter is generated for the reference beam after the reference beam has encountered each of the plurality of optical elements in the optical path of the main beam (operation 712). In this illustrative example, the measured correction parameter may be continuously generated. In other illustrative examples, the measured correction parameter may be periodically generated.

A deviation of the measured correction parameter from a desired correction parameter for the reference beam is monitored (operation 714). A determination is made as to whether the deviation of the measured correction parameter from the desired correction parameter is outside of selected tolerances (operation 716). If the deviation of the measured correction parameter from the desired correction parameter is not outside of selected tolerances, the process returns to operation 714 as described above.

Otherwise, any deviation of the measured correction parameter from the desired correction parameter that is outside of the selected tolerances is corrected to thereby adjust the line of sight of the main beam with respect to at least one of azimuth or elevation (operation 718), with the process then returning to operation 714 as described above. In operation 718, a correcting device, such a fast steering mirror, may be steered to make the correction. For example, without limitation, the angular position of the fast steering mirror may be changed to ensure that the measured correction parameter for the reference beam substantially matches the desired correction parameter for the reference beam.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a first optical system that positions a line of sight of a main beam based on a reference beam that is inertially stabilized in a selected direction, wherein the first optical system comprises a first reflector and a second reflector, wherein the second reflector comprises a reflective surface positioned to reflect the main beam and a back surface;
a reference beam generator that generates and emits the reference beam in the selected direction, wherein the reference beam generator is located outside of an optical path of the main beam, and the reference beam is reflected off of the back surface of the second reflector and directed into the optical path of the main beam; and
a second optical system that stabilizes the line of sight of the main beam using the reference beam to counteract a number of disturbances created within the optical path of the main beam.

2. The apparatus of claim 1, further comprising:
a retroreflector located outside of the optical path of the main beam, wherein the retroreflector receives the reference beam reflected off of the back surface of the second reflector and reflects the reference beam through the second reflector into the optical path of the main beam.

3. The apparatus of claim 1, wherein the first reflector and the second reflector are planar mirrors that form a coelostat-type reflector system.

4. The apparatus of claim 1 further comprising:
a first rotatable system that rotates the first reflector about an azimuth axis to control an azimuth angle of the line of sight of the main beam; and
a second rotatable system that rotates the second reflector about an elevation axis to control an elevation angle of the line of sight of the main beam.

5. The apparatus of claim 1, wherein the second optical system comprises:
a sensor device that generates a measured correction parameter for the reference beam after the reference beam has encountered each of a plurality of optical elements along the optical path of the main beam.

6. The apparatus of claim 1 further comprising:
a reference sensor system that measures an angular position of the reference beam generator; and
a control system that determines whether a relative difference between an angular position of the reference beam generator and an angular position of the second reflector is outside of selected tolerances,
wherein at least one of the first reflector or the second reflector is rotated to align the line of sight of the main beam with the selected direction of the reference beam based on the relative difference measured.

7. The apparatus of claim 2, further comprising:
a reflective element on the back surface of the second reflector that receives the reference beam from the reference beam generator and reflects the reference beam onto the retroreflector.

8. The apparatus of claim 5, wherein the sensor device is a position sensing device that measures an angle of incidence of the reference beam on the position sensing device.

9. The apparatus of claim 8, wherein the second optical system further comprises:
a correcting device that corrects for any deviation of the measured correction parameter from a desired correction parameter that is outside of selected tolerances, thereby adjusting the line of sight of the main beam with respect to at least one of azimuth or elevation.

10. The apparatus of claim 9, wherein the correcting device is a fast steering mirror that is rotatable in both azimuth and elevation.

11. A radiant energy system comprising:
a coelostat-type reflector system that controls a line of sight of a main beam and comprising a first reflector and a second reflector, wherein the second reflector comprises a reflective surface positioned to reflect the main beam and a back surface; and
a reference beam generator located outside of an optical path of the main beam,
wherein the reference beam generator emits a reference beam that is inertially stabilized in a selected direction,
wherein the reference beam is reflected off of the back surface of the second reflector and directed into the optical path of the main beam, and
wherein the coelostat-type reflector system controls a positioning of the line of sight of the main beam based on the selected direction of the reference beam.

12. The radiant energy system of claim 11 further comprising: an injection system that sends the reference beam into the optical path of the main beam.

13. The radiant energy system of claim 11, wherein:
the first reflector has a first reflective surface that is positioned to reflect the main beam and that is substantially planar; and the reflective surface of the second reflector that is positioned to reflect the main beam is substantially planar.

14. The radiant energy system of claim 12, wherein the coelostat-type reflector system is part of a first optical system and further comprising:
   a second optical system that stabilizes the line of sight of the main beam using the reference beam to counteract a number of disturbances created within the optical path of the main beam.

15. A method for stabilizing a line of sight of a radiant energy system, the method comprising:
   positioning the line of sight of a main beam using a first reflector and a second reflector based on a reference beam that is inertially stabilized in a selected direction, wherein the second reflector comprises a reflective surface positioned to reflect the main beam and a back surface, and wherein the reference beam is reflected off of the back surface of the second reflector and directed into an optical path of the main beam; and
   stabilizing the line of sight of the main beam using the reference beam to counteract a number of disturbances created within the optical path of the main beam.

16. The method of claim 15 further comprising:
   emitting the reference beam in the selected direction from a reference beam generator located outside of the optical path of the main beam.

17. The method of claim 15, wherein positioning the line of sight comprises:
   controlling an azimuth angle of the line of sight by rotating the first reflector about an azimuth axis; and
   controlling an elevation angle of the line of the sight by rotating the second reflector about an elevation axis.

18. The method claim 15, wherein positioning the line of sight further comprises:
   measuring a relative difference between angular positions of the second reflector and a reference beam generator that emits the reference beam; and
   rotating at least one of the first reflector or the second reflector to substantially align the line of sight of the main beam with the selected direction of the reference beam based on the relative difference measured.

19. The method of claim 15, wherein stabilizing the line of sight comprises:
   generating a measured correction parameter for the reference beam after the reference beam has encountered each of a plurality of optical elements along the optical path of the main beam.

20. The method of claim 19, wherein stabilizing the line of sight further comprises:
   correcting for any deviation of the measured correction parameter from a desired correction parameter that is outside of selected tolerances to thereby adjust the line of sight of the main beam with respect to at least one of azimuth or elevation.

* * * * *